United States Patent [19]

Gingerich et al.

[11] Patent Number: 4,783,906
[45] Date of Patent: Nov. 15, 1988

[54] METHOD OF MAKING A CUSTOMIZABLE ELECTRICAL ARTICLE

[75] Inventors: David J. Gingerich, Swatara; Richard F. Granitz, Harrisburg; William H. Rose, Harrisburg; David T. Shaffer, Harrisburg, all of Pa.

[73] Assignee: AMP Incorporated, Harrisburg, Pa.

[21] Appl. No.: 934,883

[22] Filed: Nov. 25, 1986

Related U.S. Application Data

[60] Division of Ser. No. 807,775, Nov. 12, 1985, Pat. No. 4,673,837, which is a continuation of Ser. No. 609,166, May 11, 1984, abandoned.

[51] Int. Cl.⁴ .............................................. H01R 43/00
[52] U.S. Cl. ...................................................... 29/827
[58] Field of Search ...................... 29/827; 174/52 FP; 439/395, 401, 402, 403, 404, 405, 516, 736, 885; 361/421; 357/70

[56] References Cited

U.S. PATENT DOCUMENTS

| | | | |
|---|---|---|---|
| 1,874,000 | 10/1932 | Ehrlich | 310/239 |
| 2,514,693 | 7/1950 | Chapman | 310/68 C |
| 3,617,786 | 11/1971 | Stiepler | 310/239 X |
| 3,697,818 | 10/1972 | Boursin | 361/421 X |
| 3,899,305 | 8/1975 | Hilgers et al. | |
| 4,054,238 | 10/1977 | Lloyd et al. | |
| 4,087,150 | 5/1978 | Kubik | 339/97 P |
| 4,089,041 | 5/1978 | Lockard | 357/70 X |
| 4,089,733 | 5/1978 | Zimmerman | 29/827 |
| 4,293,789 | 10/1981 | King | 310/71 |
| 4,293,947 | 10/1981 | Brittain | |
| 4,303,297 | 12/1981 | Smart et al. | 339/219 M |
| 4,355,253 | 10/1982 | Vollbrecht | 310/239 |
| 4,380,042 | 4/1983 | Angelucci, Sr. et al. | |
| 4,384,223 | 5/1983 | Zelt | 310/72 |
| 4,449,090 | 5/1984 | Gotoh | 310/72 |
| 4,501,983 | 2/1985 | Schmider | 310/68 R |
| 4,536,953 | 8/1985 | De Vera | 29/622 |

FOREIGN PATENT DOCUMENTS

| | | | |
|---|---|---|---|
| 0153260 | 11/1980 | Japan | 310/51 |
| 0157243 | 12/1981 | Japan | 310/51 |
| 0069449 | 4/1983 | Japan | 310/239 |
| 0826505 | 4/1981 | U.S.S.R. | 310/51 |

Primary Examiner—Howard N. Goldberg
Assistant Examiner—Carl J. Arbes
Attorney, Agent, or Firm—Anton P. Ness; Adrian J. LaRue

[57] ABSTRACT

A lead frame assembly comprises a stamped and formed lead frame having spaced pairs of electrical terminals and other contact sections. Severable sections initially interconnect potential electrical circuit sections of the lead frame separating the lead frame into separate metal members defining discrete electrical circuits if severed. A dielectric covering is molded over the lead frame exposing the pairs of terminals and other contact sections for termination or electrical engagement. Openings are formed in the housing exposing the severable sections of the lead frame for severing, to be selectively severed creating separate electrical circuit sections, or to be retained unsevered, as desired. After the molding of the covering over the lead frame, the article thus fabricated can be customized by selective severing and connecting of components as desired. Thus a method has been described for making a customizable lead frame assembly.

3 Claims, 3 Drawing Sheets

METHOD OF MAKING A CUSTOMIZABLE ELECTRICAL ARTICLE

REFERENCE TO RELATED APPLICATIONS

This is a division of application Ser. No. 807,775 filed Nov. 12, 1985 now U.S. Pat. No. 4,673,837 which is a continuation of application Ser. No. 609,166 filed May 11, 1984 now abandoned.

FIELD OF THE INVENTION

This invention relates to lead frame assemblies and more particularly to lead frame assemblies having electrical circuit paths therein.

BACKGROUND OF THE INVENTION

Conventional DC motor brush housings comprise carbon brushes that are spring biased against a commutator of the rotor and are mounted on a printed circuit or wiring board or a molded dielectric housing member. Lead wires for connection to an exterior power supply are hand soldered to circuit paths on the PCB or to posts secured in the molded housing member. Leads of capacitors and inductors for noise suppression are also hand soldered to circuit paths or posts and the metal brush holders with the capacitors being connected to ground that is generally a metal housing member in which the PCB or brush housing is mounted, the metal housing member containing a bearing in which the shaft of the rotor is mounted. These operations require numerous steps of handling, orientation of the PCB or housing member and the various components and hand soldering is required because of the irregular nature of the components and the small size of the PCB or housing member. These operations result in increased labor costs.

SUMMARY OF THE INVENTION

According to the present invention, a lead frame assembly for forming motor brush assemblies comprises a stamped and formed lead frame having potential electrical circuit sections initially integrally interconnected by severable sections. The lead frame has electrical engagement or contact sections such as spaced pairs of electrical terminals for termination to electrical power wires and lead wires of electrical components such as capacitors and inductors, if desired, and including plate contact sections and a ground contact. Severing of the severable sections which interconnect the potential electrical circuit sections would separate the lead frame into separate metal members defining actual electrical circuits. A dielectric covering is molded over the lead frame with the electrical terminals and other contact sections being accessibly exposed for termination or electrical engagement means and electrical load means and openings are located in the housing member exposing the severable sections of the lead frame for severing. Certain ones of the severable sections may be selectively severed after the housing member is secured around the lead frame creating separate electrical circuit sections, or they may be retained unsevered as desired leaving the electrical circuit sections interconnected. The lead frame assembly may be on a continuous strip of assemblies.

DETAILED DESCRIPTION OF THE INVENTION

Figure 1:
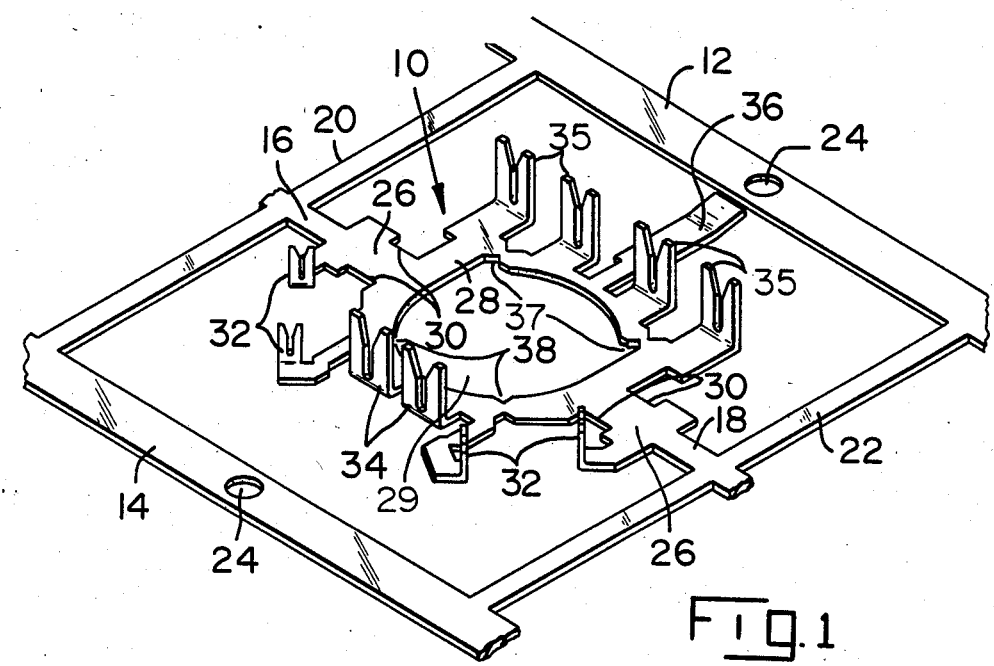
FIG. 1 is a perspective view of a stamped and formed lead frame.
Figure 2:
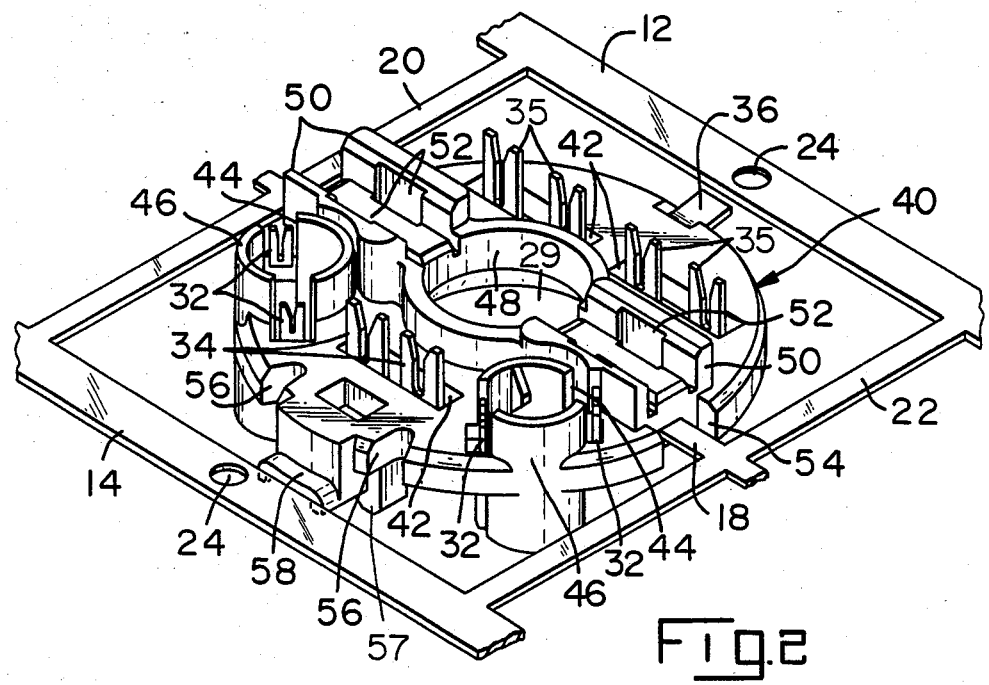
FIG. 2 is a view similar to FIG. 1 showing a dielectric housing member molded onto the lead frame forming a lead frame assembly.

FIG. 1 shows a lead frame assembly 10 that is stamped and formed from a metal strip having desirable spring and electrical characteristics and which is disposed between carrier strips 12 and 14 by metal strips 16 and 18 which are in turn connected to cross strips 20 and 22. Holes 24 are located in carrier strips 12 and 14. Metal strips 16 and 18 extend into plate sections 26 which in turn extend into a substantially circular section 28 around a large central aperture 29; recesses 30 are located in plate sections 26.

Electrical terminals 32,34,35 extend outwardly in the same direction from plate section 26 and circular section 28. Electrical terminals 32 face each other in spaced associated pairs whereas electrical terminals 34,35 are disposed in pairs with one spaced associated pair 34 located on one side of circular section 28 and two pairs 35 located on the other side. Electrical terminals 32 are smaller than electrical terminals 34,35 and the terminating sections of terminals 32, 34,35 have slots extending thereinto thereby defining electrical terminals of the insulation displacement type which are of known construction.

A ground contact 36 extends outwardly from circular section 28 between adjacent pairs of terminals 35. First serverable sections 37 and second servable sections 38 are located in circular section 28, with servable sections 37 between electrical terminals 32 on one side of circular section 28 between each of the pairs of electrical terminals 35 on the other side of circular section 28. Severable sections 37,38 remain unsevered until after a dielectric housing member is molded onto lead frame 10 to lend support to lead frame 10 prior to the molding operation.

While only one lead frame 10 is shown in FIG. 1, other lead frames will be present between carrier strips 12 and 14 to form a continuous strip of lead frames which are carried by carrier strips 12 and 14 into a conventional mold so as to mold a dielectric covering such as dielectric housing member 40 thereon as shown in FIGS. 2 through 5. The material of dielectric housing member 40 has suitable dielectric material and strength characteristics, and housing member 40 is molded over lead frame 10 so that it extends outwardly beyond the general outer periphery thereof. Severable sections 37,38 are thus located inwardly from the general outer surface of housing member 40 and also remote from terminals 32,34,35. Slots 42 are located in housing member 40 through which the terminating sections of electrical terminals 35,35 extend and the terminating sections of electrical terminals 32 are disposed in alignment with slots 44 in walls 46 which form component-receiving cavities. Circular wall 48 extends around large central aperture 29 and outwardly from the top surface of housing member 40 and surrounds an opening that extends therethrough.

Parallel wall members 50 extend outwardly from circular wall 48 along plate sections 26 and they have channels 52 on the inside wall surfaces that are in communication with recesses 30 in plate sections 26. Recesses 54 are located in the edge of housing member 40 at the locations of metal strips 16, 18. Recesses 56 are also located in the edge of housing member 40 on each side of a C-shaped strain relief member 58. Posts 57 extend from housing member 40 proximate recesses 56 and in a direction opposed from terminals 34, around which power wire leads 68 are to be wrapped, as seen in FIGS. 3 and 4.

After the housing members 40 have been molded to lead frames 10, the continuous strip of lead frames can be reeled onto a reel member from which they can be fed into a component inserting machine (not shown) or fed from the molding operation to the component inserting machine which will insert components and power lead wires into the electrical terminals as well as clinch brush holder members onto the lead frames.

Figure 3:
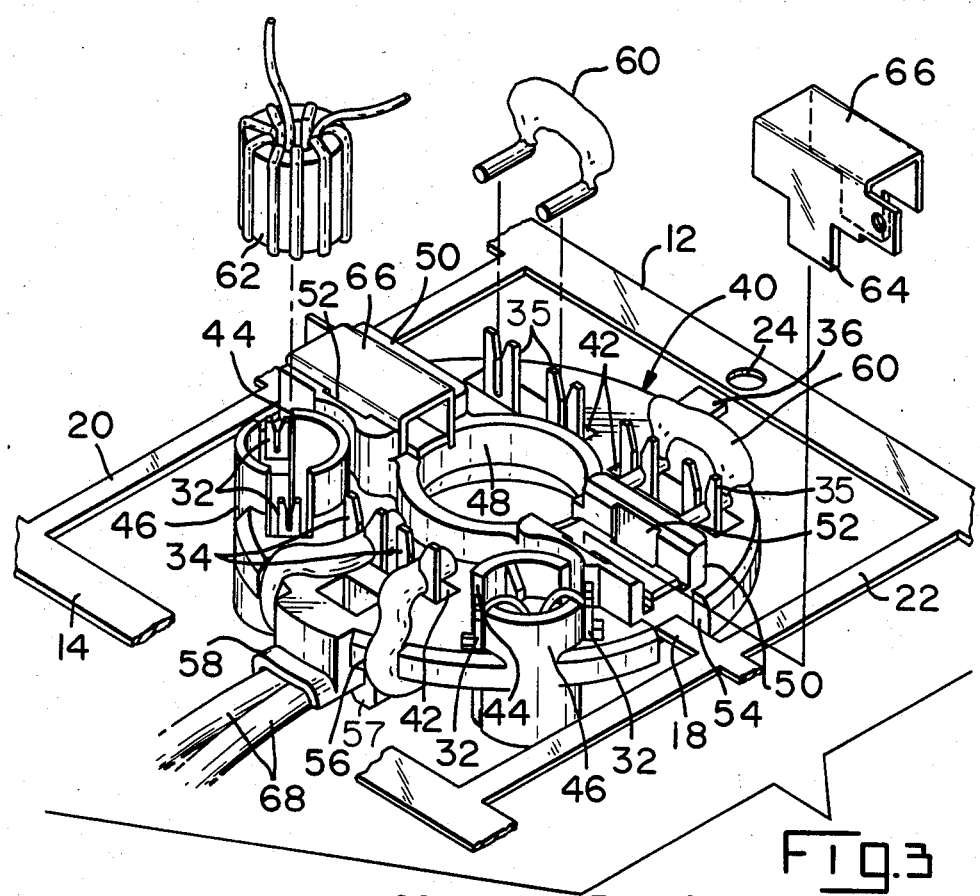
FIG. 3 is a view similar to FIG. 2 showing a partly-assembled motor brush assembly with electrical power wires, a capacitor, an inductor and a metal brush holder terminated to the lead frame assembly and parts exploded therefrom.
Figure 5:
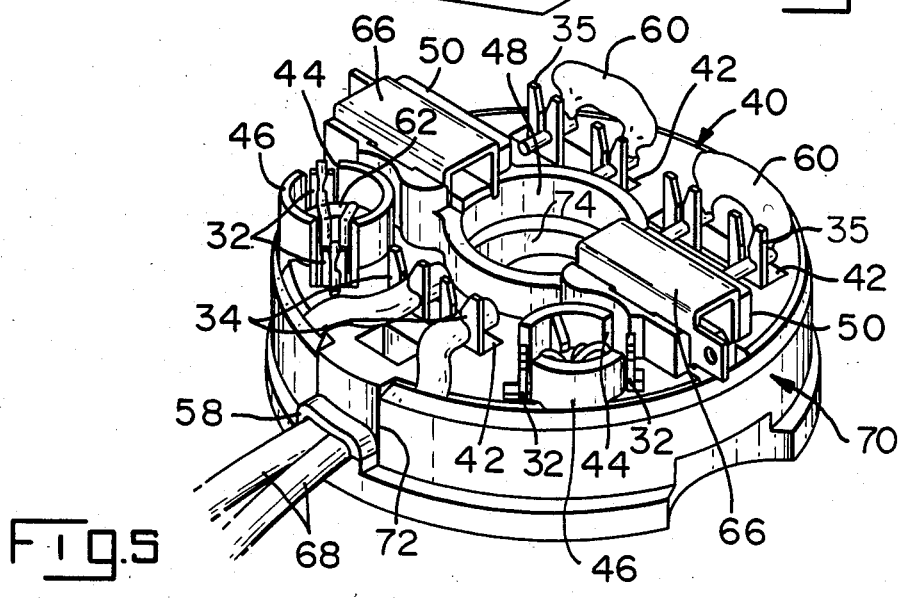
FIG. 5 is a perspective view of the motor brush assembly secured in a metal housing member.
Figure 4:
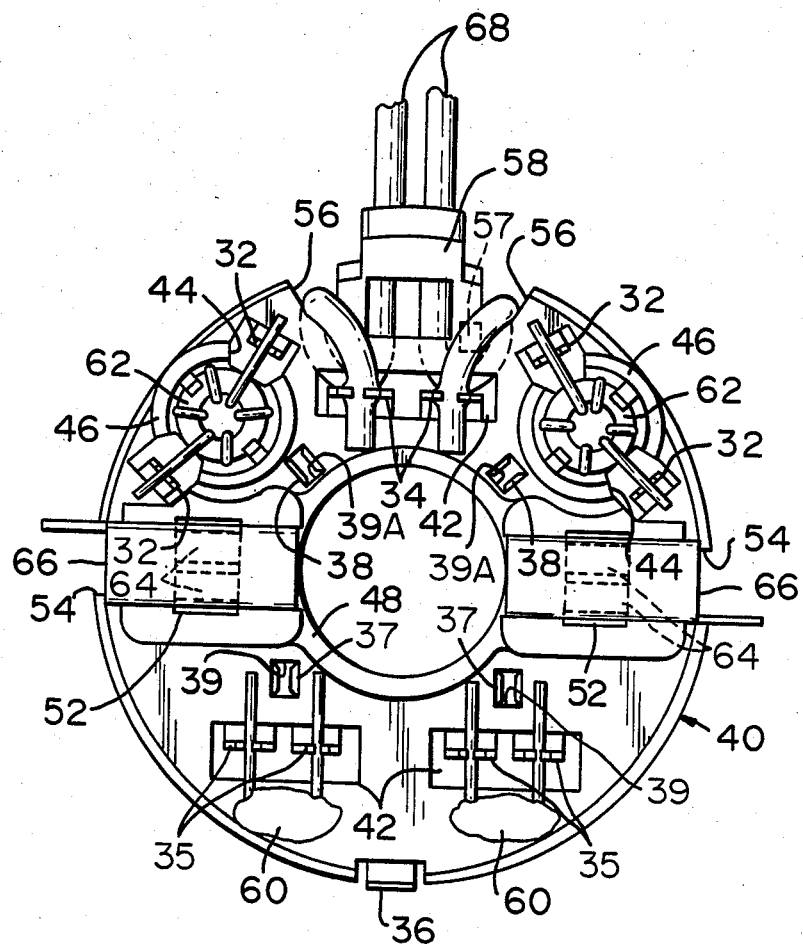
FIG. 4 is a top plan view of FIG. 3 of a motor brush assembly in an assembled condition.

In assembly, the lead wires of capacitors 60 are terminated in the slots of electrical terminals 35 while inductors 62 are disposed in the cavities formed by walls 46 and lead wires thereof are terminated in the slots of electrical terminals 32 as shown in FIGS. 3, 4, and 5. Lugs 64 of metal brush holders 66 extend along channels 52 between wall members 50 and they are bent into electrical engagement with exposed plate sections 26 in the bottom surface of housing member 40 thereby securing brush holders 66 in mechanical and electrical engagement between wall members 50 (not shown in the drawings). Insulated lead wires 68 have their ends terminated in the slots of electrical terminals 34 and are then disposed in respective recesses 56 and in strain relief member 58.

A motor brush assembly is thereby formed and can now be severed from cross strips 20,22 by severing metal strips 16 and 18 in recesses 54 whereafter the motor brush assembly can be secured in a metal housing member 70 which includes a bearing member 74 in alignment with the opening defined by circular wall 48 and an opening 72 in which strain relief member 58 is located to permit lead wires 68 to extend outwardly therefrom. Although not shown in the drawings, ground contact 36 electrically engages metal housing member 70 to form a ground connection therewith.

Severable sections 37,38 are exposed in first and second openings 39, 39A respectively in housing member 40 as shown in FIG. 4 with openings 39,39A being wider than severable sections 37,38. The severable sections 37 disposed between terminals 35 in which capacitors 60 are terminated will be severed whereas the severable sections 38 disposed between electrical terminals 32 will be severed if inductors 62 are terminated therein. After severable sections 37 are severed, lead frame 10 becomes separated into separate electrical sections, with ones of associated pairs of terminals 35 being part of a single electrical circuit section containing ground contact 36 and the others thereof being part of respective others of the separate electrical sections containing respective plate sections 26 and both of terminals 32 and one of terminals 34; and if severable sections 38 are severed, lead frame 10 becomes separated into further electrical sections each containing one of terminals 32 and one of terminals 34. The use of inductors 62 in conjunction with capacitors 60 is more effective in noise suppression.

A motor brush assembly has been disclosed that utilizes a stamped and formed lead frame to which has been molded a dielectric housing member forming a lead frame assembly which includes electrical terminals for terminating lead wires of capacitors and inductors and power lead wires, and the housing member has cavities in which the inductors are disposed.

We claim:

1. A method of forming a lead frame assembly comprising the steps of:
   forming an integral lead frame from metal sufficiently thick withstand handling after forming, said lead frame having a general outer periphery having a plurality of openings located inwardly from said general outer periphery defining integrally joined metal sections, said integral lead frame including formed thereon a plurality of electrical engagement sections each of which is adapted to be electrically engaged by a respective electrical conductor means, and said integral lead frame further including a sufficient number of severable sections located at selected locations inwardly from said general outer periphery and remote from said electrical engagement sections so that severing thereof would separate said integral member into separate metal members at least two of which each include at least two said electrical engagement sections and define electrical circuit paths;
   securing a dielectric covering over said integral lead frame and extending at least outwardly to said general outer periphery thereof and around substantial portions of said metal sections exposing at least said electrical engagement sections and including a general outer surface disposed outwardly from said severable sections, whereby a lead frame assembly is fully fabricated; and
   locating and severing at least an appropriate one of said severable sections thereby forming at least two separate electrical circuits each having at least two said electrical engagement sections, whereby a fully fabricated lead frame assembly is capable of being customized after fabrication thereof by selective severing of said severable sections.

2. A method of forming an electrical article for electrically connecting an electrical power supply means and at least one electrical load means comprising the steps of:
   forming an integral lead frame having a general outer periphery and having a plurality of metal sections each including at least two contact sections formed therein thereby defining potential circuit sections, said plurality of metal sections being initially interconnected only by severable sections located inwardly from said general outer periphery of said lead frame and remote from said contact sections; and
   molding a dielectric covering onto said lead frame and extending at least outwardly to said general outer periphery thereof and around substantial portions of said interconnected metal sections with said contact sections being exposed to be electrically connected to said power input means and said load means, and said covering including a general outer surface disposed outwardly from said severable sections and having molded therein openings exposing said severable sections and having dimensions wider than said severable sections such that said severable sections are severable therewithin to form at least two electrically separate metal members from said metal sections defining at least two discrete electrical circuits each having at least two said contact sections for electrically interconnecting said power supply means and a said load means, whereby an electrical article is fully fabricated and is adapted to be customized remote from the fabrication site by selective severing of said severable sections.

3. A method as set forth in claim 2 further including after said molding step the steps of selecting at least one of said severable sections to remain unsevered and severing the remaining others of said severable sections.

* * * * *